US007229173B2

United States Patent
Menezes

(10) Patent No.: US 7,229,173 B2
(45) Date of Patent: Jun. 12, 2007

(54) SHORT CORRIDOR PROGRESSIVE ADDITION LENSES WITH REDUCED UNWANTED ASTIGMATISM

(75) Inventor: Edgar V. Menezes, Roanoke, VA (US)

(73) Assignee: Essilor International (Compagnie Generale d'Optique) S.A. (FR)

( * ) Notice: Subject to any disclaimer, the term of this patent is extended or adjusted under 35 U.S.C. 154(b) by 0 days.

(21) Appl. No.: 10/925,721

(22) Filed: Aug. 25, 2004

(65) Prior Publication Data

US 2006/0050236 A1   Mar. 9, 2006

(51) Int. Cl.
  G02C 7/06 (2006.01)
  G02C 7/02 (2006.01)
(52) U.S. Cl. ..................... 351/169; 351/177
(58) Field of Classification Search ............... 351/169, 351/177
  See application file for complete search history.

(56) References Cited

U.S. PATENT DOCUMENTS

| 4,676,610 | A | 6/1987 | Barkan et al. |
| 4,786,160 | A | 11/1988 | Fuerter et al. |
| 6,106,118 | A * | 8/2000 | Menezes et al. ............ 351/169 |
| 6,142,627 | A | 11/2000 | Winthrop |
| 6,595,638 | B2 | 7/2003 | Ahsbahs |
| 6,955,433 | B1 * | 10/2005 | Wooley et al. ............ 351/177 |
| 2003/0086055 | A1 | 5/2003 | Morris et al. |
| 2003/0156251 | A1 | 8/2003 | Welk et al. |

FOREIGN PATENT DOCUMENTS

WO   2004/104674   12/2004

OTHER PUBLICATIONS

Patent Cooperation Treaty Publication WO 2006/026057 A3 including International Search Report, Mar. 3, 2006, 6 pages.

* cited by examiner

Primary Examiner—Jordan M. Schwartz
(74) Attorney, Agent, or Firm—Occhiuti Rohlicek & Tsao LLP

(57) ABSTRACT

The invention provides lenses produced by the adding of two or more surfaces, in which lenses both the length of the corridor is shortened and the maximum unwanted astigmatism is reduced.

32 Claims, 11 Drawing Sheets

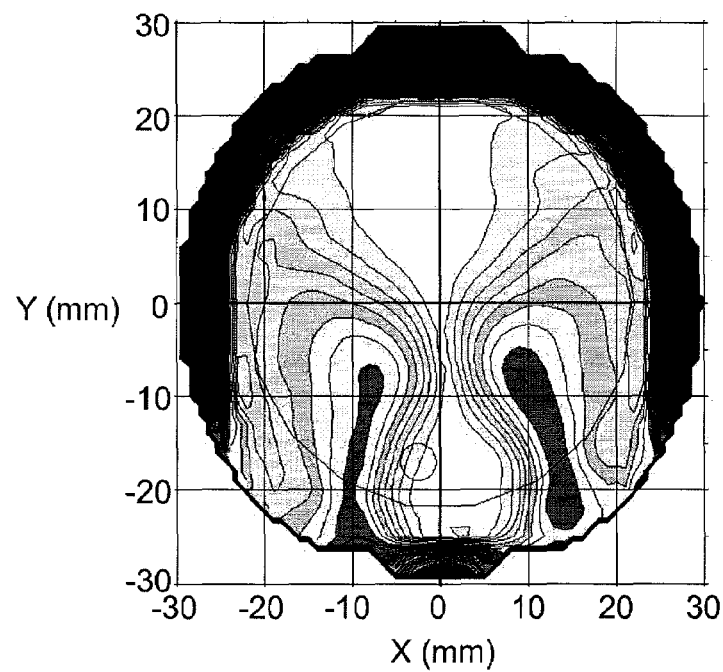
FIG. 1a *PRIOR ART*
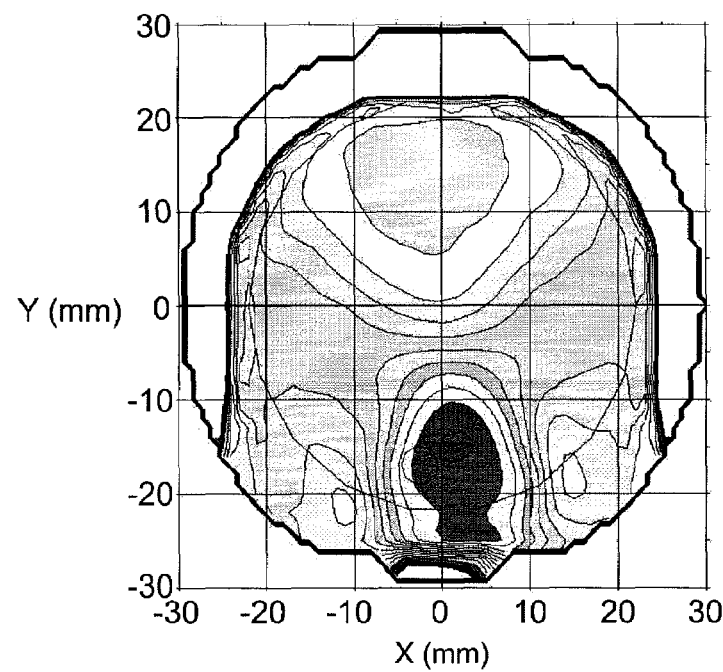
FIG. 1b *PRIOR ART*

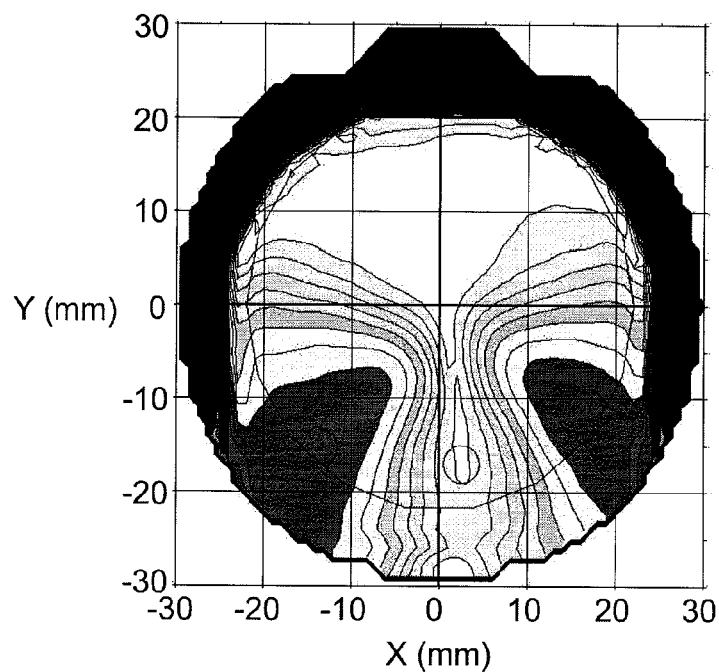
FIG. 2a  *PRIOR ART*
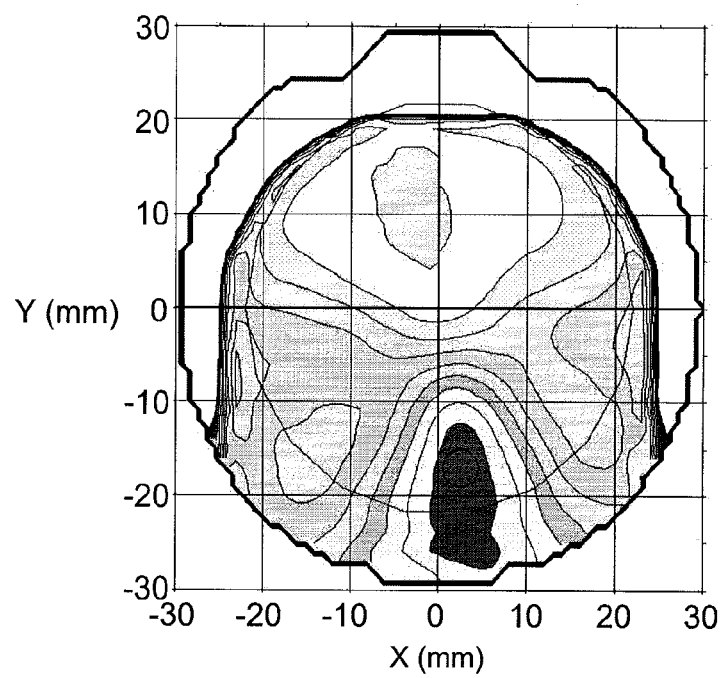
FIG. 2b  *PRIOR ART*

SHORT CORRIDOR PROGRESSIVE ADDITION LENSES WITH REDUCED UNWANTED ASTIGMATISM

FIELD OF THE INVENTION

The present invention relates to multifocal ophthalmic lenses. In particular, the invention provides progressive addition lens designs with both a shortened corridor and reduced unwanted astigmatism.

BACKGROUND OF THE INVENTION

The use of ophthalmic lenses for the correction of ametropia is well known. For example, multifocal lenses, such as progressive addition lenses ("PALs") are used for the treatment of presbyopia. PALs have at least one progressive surface that provides far, intermediate, and near vision in a gradual, continuous progression of vertically increasing dioptric power from far to near focus, or top to bottom, of the lens.

PALs are appealing to the wearer because PALs are free of the visible ledges between the zones of differing dioptric power that are found in other multifocal lenses, such as bifocals and trifocals. However, an inherent disadvantage of PALs is the presence of unwanted astigmatism, or astigmatism that is undesirable and is introduced or caused by one or more of the lens' surfaces. Unwanted astigmatism can produce swim, image magnification, and motion effects for the lens wearer that disrupts the wearer's vision. In hard PAL lens designs, the unwanted astigmatism borders the lens channel and near vision zone. In soft designs, the unwanted astigmatism may extend into the distance zone.

Typical PALs have a 12 to 14 mm in length corridor between the fitting point and the point along the prime meridian of the lens at which the power reaches 85% of the lens' add power. Although such a corridor helps provide more gradual power changes and lower levels of unwanted astigmatism, the near viewing zone is often cut-off when lenses of these designs are mounted into standard frames.

Some PAL lenses have been designed with short corridors in the 9 mm to 12 mm range, but these PALs typically have much higher levels of unwanted astigmatism. If a PAL wearer has become accustomed to a particular design in a standard size frame and then chooses to switch to a smaller frame, typically the ECP must switch the patient into another PAL brand, which may result in wearer adaptation problems.

BRIEF DESCRIPTION OF THE DRAWINGS

FIG. 1a is a cylinder contour map of the unwanted astigmatism of a first prior art progressive lens.

FIG. 1b is a power contour map of the lens of FIG. 1a.

FIG. 1c is a corridor power and cylinder profile of the lens of FIG. 1a.

FIG. 2a is a cylinder contour map of the unwanted astigmatism of a second prior art progressive lens.

FIG. 2b is a power contour map of the lens of FIG. 2a.

FIG. 2c is a corridor power and cylinder profile of the lens of FIG. 2a.

FIG. 3b is a power contour map of the lens of FIG. 3a.

FIG. 3c is a corridor power and cylinder profile of the lens of FIG. 3a.

FIG. 4b is a power contour map of the lens of FIG. 4a.

FIG. 4c is a corridor power and cylinder profile of the lens of FIG. 4a.

FIG. 5b is a power contour map of the lens of FIG. 5a.

FIG. 5c is a corridor power and cylinder profile of the lens of FIG. 5a.

FIG. 7b is a magnified view of the markings of FIG. 7a.

DESCRIPTION OF THE INVENTION AND ITS PREFERRED EMBODIMENTS

Figure 1C:
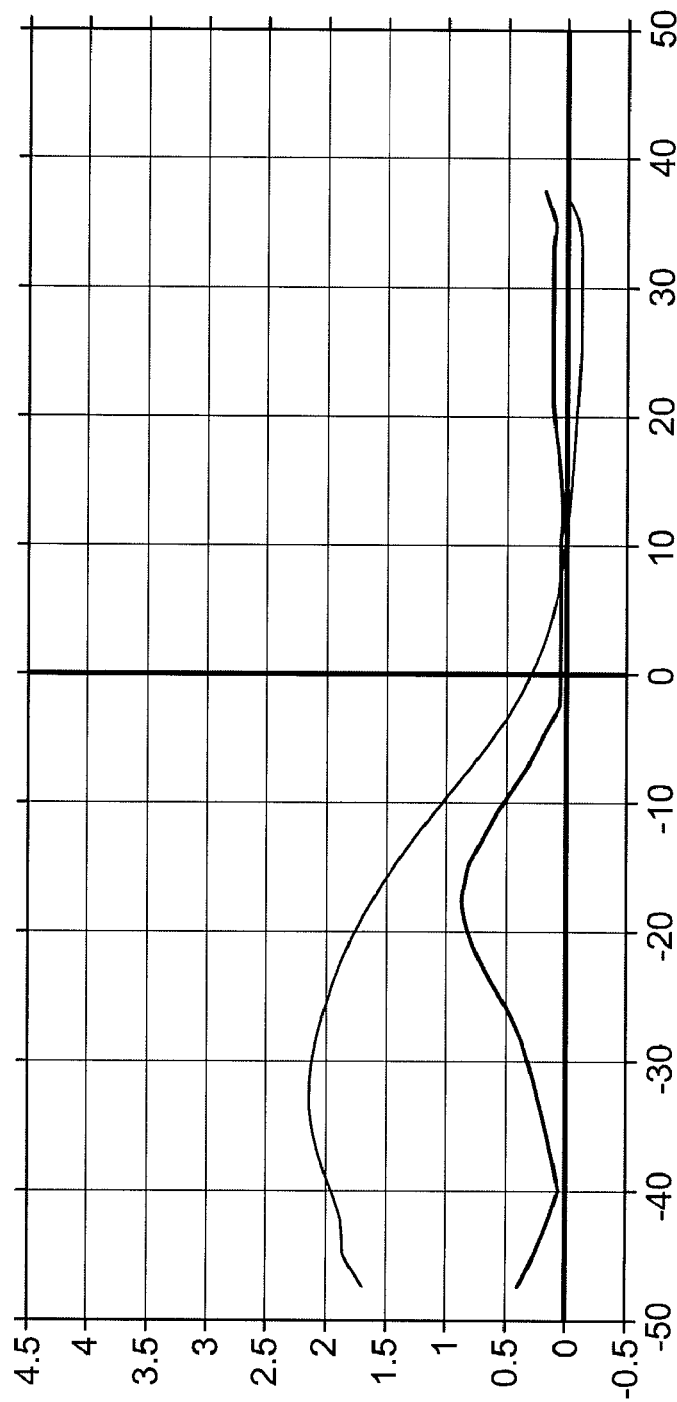

The present invention provides lenses, and methods for their design and manufacture, in which both the length of the corridor is shortened and the maximum unwanted astigmatism is reduced. The lenses of the invention are provided by adding two or more progressive surfaces.

In one embodiment, the invention provides a method for designing a progressive addition lens, comprising, consisting essentially of, and consisting of: a.) providing a first progressive addition surface having a first add power and a first corridor of a first length; b.) expressing the first surface as a first plurality of sag values; c.) multiplying the first plurality of sag values by a first blending function; d.) providing a second progressive addition surface having a second add power and a second corridor of a second length; e.) expressing the second surface as a first plurality of sag values; f.) multiplying the second plurality of sag values by a second blending function that may be the same or different from the first blending function; g.) adding the first and second plurality of sag values to produce a third progressive surface having the first add power, a third corridor wherein a length of the third corridor is at least about 1 mm less than either or both the first and second corridor lengths.

In a preferred embodiment, the invention provides a method for designing a progressive addition lens, comprising, consisting essentially of, and consisting of: a.) providing a first progressive addition surface having a first add power, a first corridor of a first length and a first unwanted astigmatism; b.) expressing the first surface as a first plurality of sag values; c.) multiplying the first plurality of sag values by a first blending function; d.) providing a second progressive addition surface having a second add power, a second corridor of a second length and a second unwanted astigmatism; e.) expressing the second surface as a first plurality of sag values; f.) multiplying the second plurality of sag values by a second blending function that may be the same or different from the first blending function; g.) adding the first and second plurality of sag values to produce a third progressive surface having the first add power, a third corridor wherein a length of the third corridor is at least about 1 mm less than either or both the first and second corridor lengths and a third maximum unwanted astigmatism wherein the third unwanted astigmatism is greater by about 0.2 or less diopters than one or both of the first and second maximum astigmatism.

By "lens" is meant any ophthalmic lens including, without limitation, a spectacle, contact, intraocular lens, and the like. Preferably, the lens of the invention is a spectacle lens. By "sag value" is meant the absolute value of the z-axis distance between a point on a progressive surface located at coordinates (x, y) and a corresponding point on a reference plane. For purposes of the invention, the z-axis is the axis orthogonal to the x-y plane.

By "progressive addition surface" or "progressive surface" is meant a continuous, aspheric surface having distance and near viewing zones, and a zone of increasing dioptric power connecting the distance and near zones. One ordinarily skilled in the art will recognize that, if the progressive surface is the convex surface of the lens, the distance vision zone curvature will be less than that of the near zone curvature and if the progressive surface is the lens' concave surface, the distance curvature will be greater than that of the near zone.

By "corridor" is meant a channel of vision the width of which is the area of vision that is free of unwanted astigmatism of about 0.75, preferably about 1.00, diopters or greater when the wearer's eye is scanning through the intermediate vision zone to the near vision zone and back and the length is the area between the fitting point and the point along the prime meridian of the lens at which the power reaches 85% of the lens' add power.

By "unwanted astigmatism" is meant astigmatism that is undesirable and is introduced or caused by the lens surface. For purposes of the invention, the areas of unwanted astigmatism considered are those located on either side of the channel and preferably below the fitting point. By "fitting point" is meant the point on a lens aligned with the wearer's pupil in its distance viewing position when the wearer is looking straight ahead.

The method of the invention may be used to design any progressive lens. However, the method may find its greatest utility in the design of progressive lenses in which the corridor length is less than about 12 mm and which have a maximum unwanted astigmatism that is less than about 80% of the total add power of the lens. Thus, in yet another embodiment, the invention provides a progressive lens comprising, consisting essentially of, and consisting of a corridor having a length of less than about 12 mm and a maximum unwanted astigmatism of less than about 80% of a total add power of the lens.

In the first step of the method of the invention, a first progressive surface is provided by any convenient optical design method. The surface, U may be a single progressive surface or a surface that is the result of combining one or more progressive and regressive surfaces. By "regressive surface" is meant a continuous, aspheric surface having zones of distance and near vision and a zone of decreasing dioptric power connecting the distance and near zones. If the regressive surface is the convex surface of the lens, the distance zone curvature will be greater than that of the near zone and if the regressive surface is the lens' concave surface the distance curvature will be less than that of the near zone.

In carrying out the method of the invention, designing of the surface preferably is carried out using a method that divides the surface into a number of sections and provides a curved surface equation for each area as disclosed, for example, in U.S. Pat. No. 5,886,766 incorporated herein in its entirety by reference. Optimization of the surface may be carried out by any convenient method. Additional properties of a specific lens wearer may be introduced into the design optimization process including, without limitation, variations in the pupil diameter of about 1.5 to about 7 mm, image convergence at a point about 25 to about 28 mm behind the front vertex of the surface, pantoscopic tilt of about 7 to about 20 degrees and the like, and combinations thereof.

The distance and near vision powers for the surface design are selected so that powers of the lens are those needed to correct the lens wearer's visual acuity. The dioptric add power for the surfaces will typically be about +0.10 to about +6.00 diopters. Generally, the distance curvature of the progressive surfaces will be within about 0.25 to about 8.50 diopters. The near vision curvature will be about 1.00 to about 12.00 diopters.

The first progressive surface, U, is then expressed as a plurality of sag values. The sag values are calculated by subtracting U from a base spherical surface $U_o$, with a curvature equal to the distance curvature or base curvature, to yield the surface's sag values u(x,y). The steps of providing a progressive surface and expressing the surface as a plurality of sag values is repeated for a second progressive surface, V which yields the surface's sag values, v(x, y) by subtraction from a base spherical surface $V_o$. The second surface may be the same or, preferably, different from the first surface. In either case, the optical centers and distance measurement locations of the surfaces preferably are aligned to within manufacturing tolerances, typically between about ±0.25 mm to about ±0.5 mm, or unwanted changes in power and introduction of prism will result.

The first and second plurality of sag values are then each multiplied by a blending function and added to produce a third progressive surface. The blending function used for each surface may the same or, preferably, different from the function used for the other surface. In one embodiment, the added progressive addition surface may be expressed as sag departures from a reference sphere, $W_o(x,y)$, as follows:

$$w(x,y)=F(x,y)*u(x,y)+G(x,y)*v(x,y) \quad (I)$$

wherein F and G are each a different blending function.

In another embodiment, the same blending function, F, is used and the added progressive addition surface may be calculated according to the equation:

$$w(x,y)=F(x,y)*u(x,y)+\{1-F(x,y)\}*v(x,y) \quad (II)$$

Several types of blending functions may be used and selection of a blending function will be dependent upon its shape. Preferred functions will be equal to 1.0 at the optical center and decay to 0 at the edge of the lens.

One convenient form for F is $$F(x,y)=\{1-e^{[a*(x2+y2)]}\}+1[1+b*(x^2+y^2)] \quad (III)$$

wherein a and b are blending constants that control the weight given U and V as a function of x and y.

Surfaces U and V may be scaled to different add powers prior to the addition step. In the case in which the progressive surfaces to be added are the same, which is preferred, the surfaces will need to be scaled to two different values prior to adding. Scaling enables the corridor of the blended surface to be changed to achieve design objectives. The corridor length of each surface may be the same or, preferably, different. If different corridor lengths are chosen, the corridor lengths must be selected to ensure that the wearer's required distance and add powers are substantially maintained.

Additionally, the surfaces to be added may have areas of unwanted astigmatism that are aligned or preferably misaligned. By misaligned is meant that the location of the areas of unwanted astigmatism of one surface do no substantially coincide with the areas of unwanted astigmatism of the other surface. The latter option has the advantage in that the misaligning the astigmatism maxima of the surfaces reduces the overall maximum, unwanted astigmatism of the added surface.

In an optional, and preferred, final step of the method of the invention, the resulting surface may be smoothed by any suitable fitting technique to eliminate curvature discontinuities that result in localized power changes of greater than about 0.05 diopters. Any known technique may be used including, without limitation, fitting using polynomial, splines and the like. Preferably, the blending function is selected so that no discontinuities are introduced into the blended surface that cannot be smoothed.

Optimization of the added surface may be accomplished by the establishment and maximization of a merit function weighing distance, intermediate and near vision, corridor length and width, distortion and swim. One such merit function is the Corridor Factor, $C_f$ which is defined as:

$$C_f = \{A_M/A_p\} * C_L \quad \text{(VI)}$$

wherein $A_M$ is the maximum in unwanted astigmatism;
$A_p$ is the add power; and
$C_L$ is the corridor length. Minimization of $C_f$ for a given corridor length will produce a design more suitable for a wearer.

The resulting added and smoothed surface will not change substantially from the first surface in the distance, near or prism powers provided the blending is performed within the constraints outlined above. However, if significant changes do occur, appropriate compensations in power may be incorporated into a complementary surface of the lens to offset the changes. Accordingly, other surfaces designed to adapt the lens to the ophthalmic prescription of the lens wearer may be used in combination with, or addition to, the optimized progressive addition surface. Additionally, the individual surfaces of the lens may have a spherical or aspherical distance vision zone. The corridor may be closer to the distance or near viewing zone. Further, combinations of any of the above variations may be used.

In a preferred embodiment, the lens of the invention has as its convex surface the surface of the invention and a complementary concave surface, which concave surface corrects the wearer's astigmatism and prism. The convex surface preferably is of a symmetric, soft progressive design produced by combining two convex progressive surfaces, each of which surfaces has a channel length of about 10 to about 22 mm. One surface has an aspherical distance viewing zone and the maximum, localized unwanted astigmatism is located closer to the distance than the near viewing zone preferably on either side of the upper two thirds of the channel. The distance zone preferably is aspherized to provide additional plus power to the surface of up to about 2.00 diopters, preferably up to about 1.00 diopters, more preferably up to about 0.50 diopters. Aspherization may be outside of a circle centered at the fitting point having a radius of about 10 mm, preferably about 15 mm, more preferably about 20 mm. The other surface has no aspherical distance viewing zone and the maximum, localized unwanted astigmatism is located closer to the near viewing zone than the distance viewing zone, preferably on either side of the lower two thirds of the corridor.

Because the shortened corridor surface of the invention may be achieved with a low level of unwanted astigmatism, a lens produced by this design method may be either fit at the optical center, y=0 mm, or some distance above the optical center to improve distance vision. The range of fitting location may be raised between about 1 mm and 5 mm, preferably between about 2 mm and 3 mm from the optical center. This range provides greater flexibility in addressing the wearer's visual needs than conventional lens designs.

Figure 6:
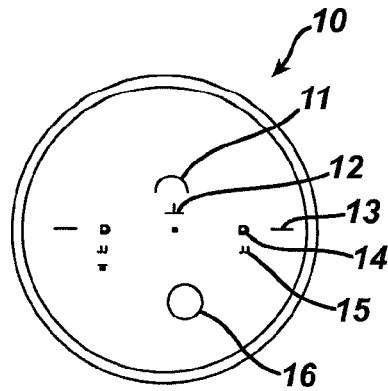
FIG. 6 is a depiction of a prior art PAL lens markings.
Figure 7A:
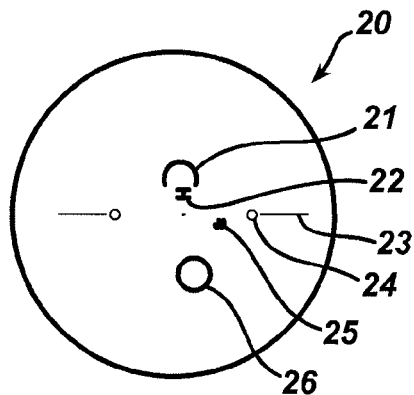
FIG. 7a is a depiction of the markings of a lens according to the invention.
Figure 7B:
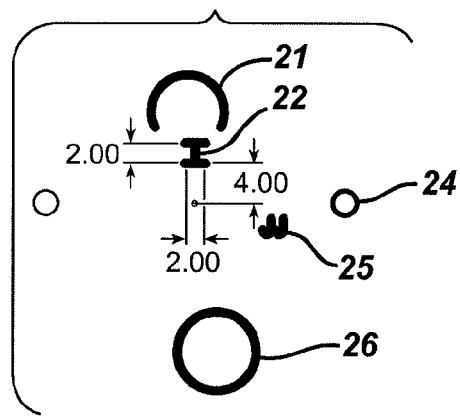

In order to facilitate such a flexibility, the present invention also provides PAL markings. The markings may be placed on the lens surface or a film that is affixed to the lens surface. Prior art markings typically have a single point location for the fitting point demarcated, as illustrated in FIG. 6. FIG. 6 depicts lens surface 10 upon which is marked distance reference point 11, fitting cross 12, a 1–80 degree line 13, prism reference point 14, manufacturer's logo 15, and near reference circle 16. The markings of the invention, as illustrated in FIGS. 7a and 7b, has a bounded fitting line at any point along which the optician may place the fitting point. More specifically, in FIG. 7a is shown lens surface 20 upon which is marked distance reference point 21, fitting line 22, 0–180 degree line 23, prism reference point 24, manufacturer's logo 25 and near reference circle 26. In FIG. 7b is a magnified view depicting the fitting line 22 which, as shown, is about 2 mm. The fitting line may be of any convenient length, but preferably is about 1 mm to about 5 mm.

Thus, in another embodiment the invention provides for a marking comprising, consisting essentially of, and consisting of: a) a location mark for measuring the distance power; b) a location mark for measuring the near power; c) a location mark for measuring the prism power; and d) a linear mark of at least 1 mm in length along which the fitting point may be located.

The lenses of the invention may be constructed of any known material suitable for production of ophthalmic lenses. Such materials may be constructed of any known material suitable for production of ophthalmic lenses. Such materials are either commercially available or methods for their production are known. Further, the lenses may be produced by any conventional lens fabrication technique including, without limitation, grinding, whole lens casting, molding, thermoforming, laminating, surface casting, or combinations thereof.

The invention will be clarified further by a consideration of the following, non-limiting examples.

EXAMPLES

A contour map for a commercially available short corridor progressive lens, AO Compact™, Lens 1, was created using a coordinate measuring machine and using the sag values obtained in a ray trace program to obtain power and cylinder profiles. FIG. 1a and FIG. 1b show the cylinder profile and power contours, respectively, of the lens, and FIG. 1c shows the corridor power and cylinder profiles. Lens 1 had a refractive index of 1.498, base curve of 95.1 mm and add power of 2.04 diopters. The corridor length was 11.6 mm and the maximum unwanted astigmatism was 2.64 diopters. The corridor factor, $C_f$ was 15.0 mm.

Figure 2C:
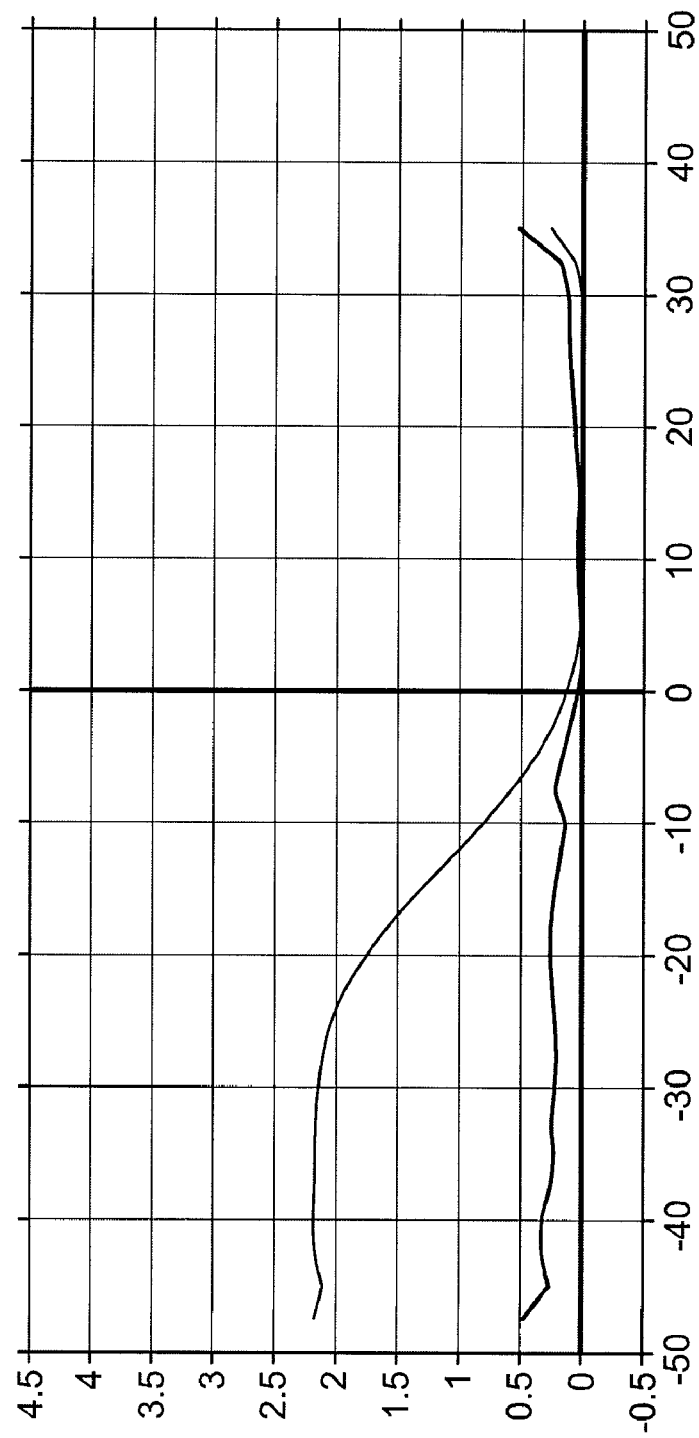

FIGS. 2a and 2b are cylinder and power contour maps, respectively, created for Lens 2, a second commercially available short corridor progressive lens, Varilux ELLIPSE™, having a refractive index of 1.498, a base curve of 105.5 mm and 2.15 diopter add power. FIG. 2a shows that the corridor length is 10.5 mm. The maximum unwanted astigmatism for the second lens was 2.53 diopters. The corridor factor, $C_f$ was 11.5 mm.

Figure 3A:
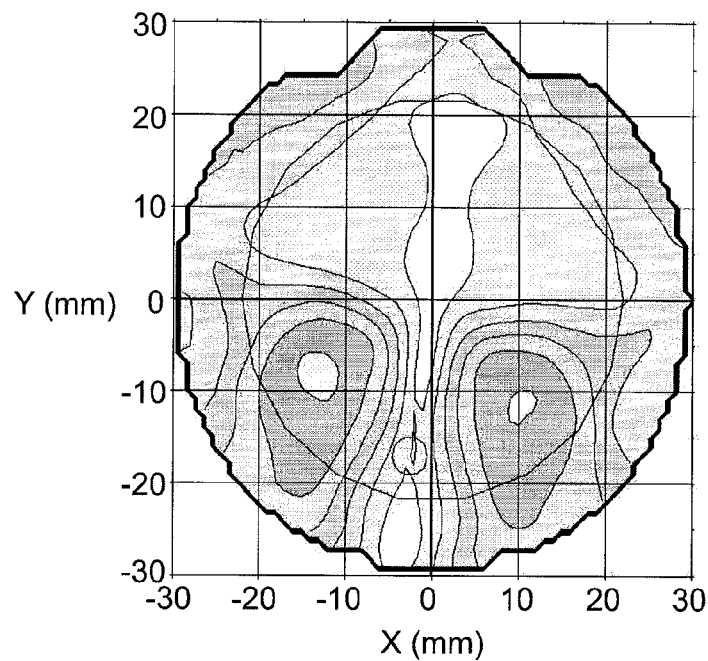
FIG. 3a is a cylinder contour map of the unwanted astigmatism of a third prior art progressive lens.
Figure 3B:
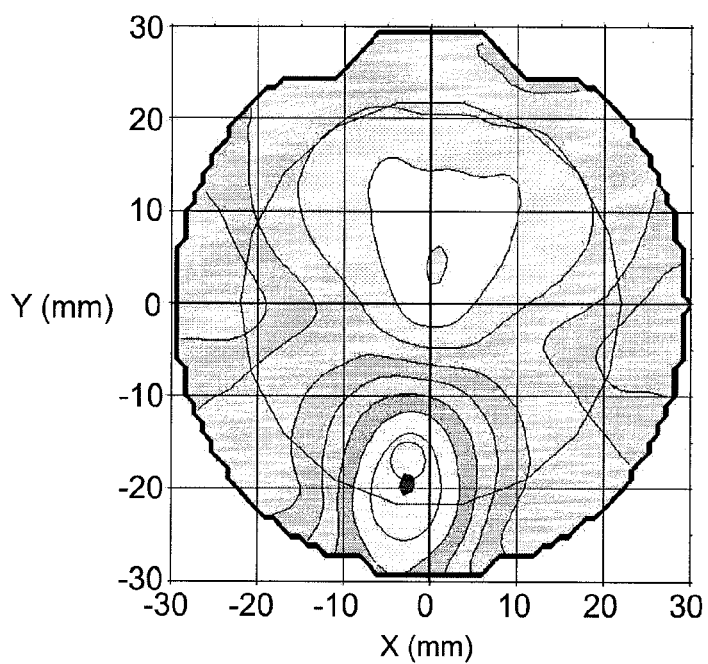
Figure 3C:
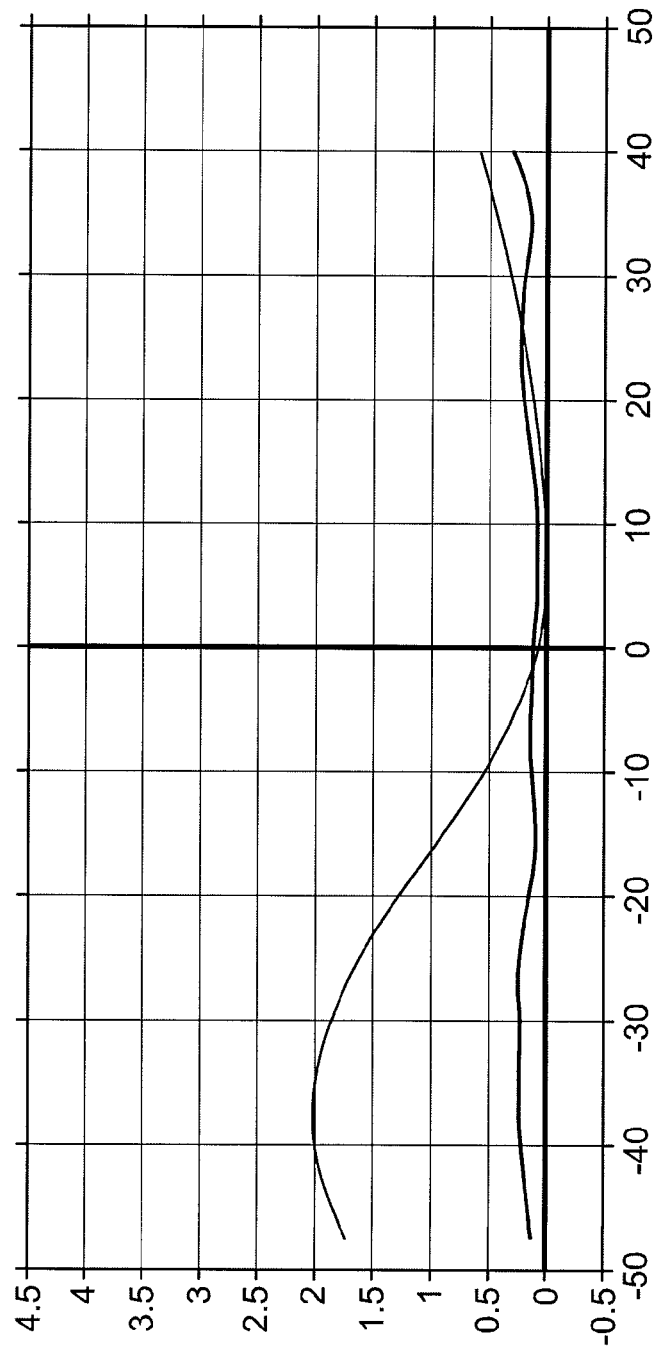

FIGS. 3a and 3b are cylinder and power contour maps, respectively, created for a standard corridor commercially available progressive lens, Lens 3, DEFINITY™, having a refractive index of 1.51, a base curve of 106.2 mm and 2.04 diopter add power. FIG. 3c shows that the corridor length was 12.3 mm. The maximum unwanted astigmatism within this area was 1.64 diopters. The corridor factor, $C_f$ was 9.23 mm.

Example 1

A first progressive surface was designed using a material with a refractive index of 1.515. The lens' base curve was 104.3 mm and the add power was 2.04 diopters. This surface had a standard length corridor of 12.3 mm and maximum unwanted astigmatism is 1.56 diopters. The corridor factor $C_f$ was 9.40 mm. The surface U was scaled with the following scaling factor: $u(x,y)=1.019*U(x,y)$.

A second progressive surface having the same refractive index, base curve, add power, corridor length, corridor factor and maximum unwanted astigmatism as the first surface was also designed. The second surface was scaled to a lower add power with the following scaling factor $v(x,y)=1.045*U(x,y)$ according to the design methodology of the invention.

The first and second surfaces were added using the blending function F of Equation. III with $a=-0.001466$ and $b=0.018$. The addition and blending result in the following equation for the resulting progressive surface $w(x,y)$:

$$w(x, y) = 1.019*u(x, y)*\{1 - e^{[a*(x2+y2)]} + 1/[1 + b*(x^2 + y^2)]\} + 1.045*u(x, y)*\{e^{[a*(x2+y2)]} - 1/[1 + b*(x^2 + y^2)]\}$$

Figure 4A:
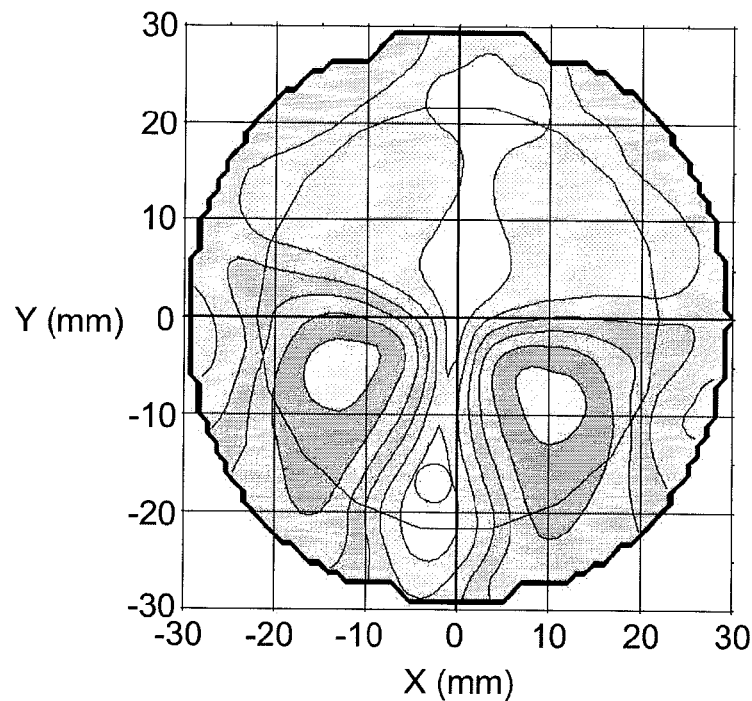
FIG. 4a is a cylinder contour map of the unwanted astigmatism of a first lens of the invention.
Figure 4B:
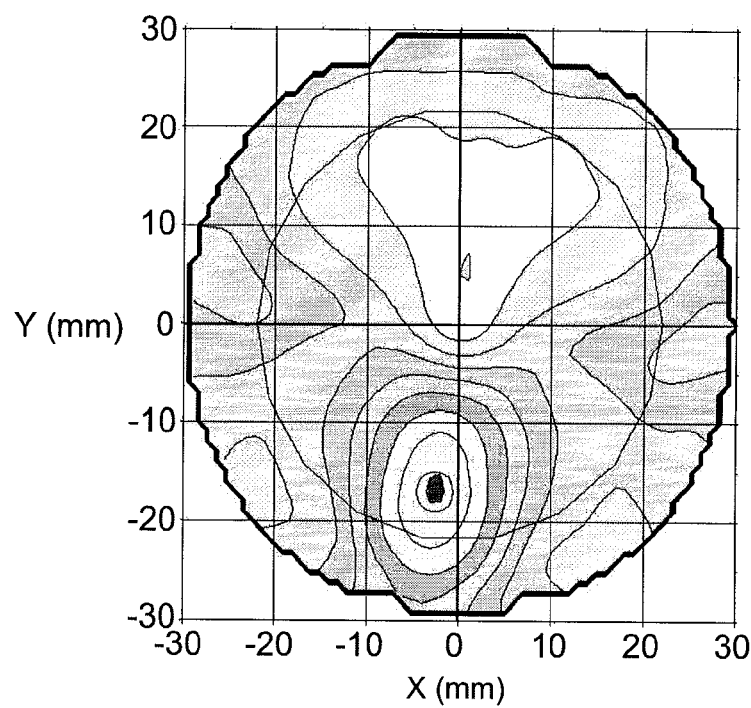
Figure 4C:
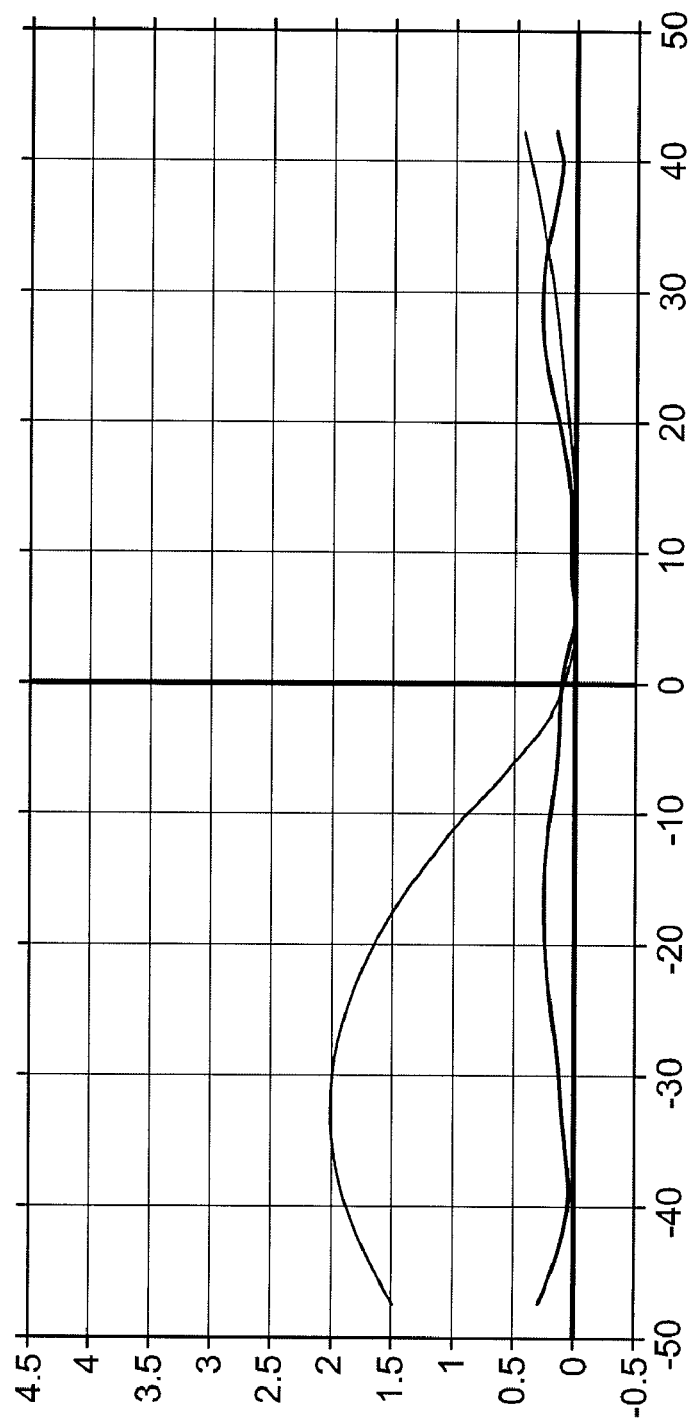

The optical data for the resultant progressive surface (W) is shown in Table 1. The power and cylinder contour plots are shown in FIGS. 4a and 4b and the power and the power and cylinder profile along the corridor in FIG. 4c. The corridor length has been shortened to 10.4 mm, which is typical of a short corridor design, but the maximum, localized astigmatism increase by only 0.02 diopters to 1.58 diopters. The corridor factor, $C_f$ was 8.17 mm. The fitting point is located at y=0 mm.

Example 2

Figure 5A:
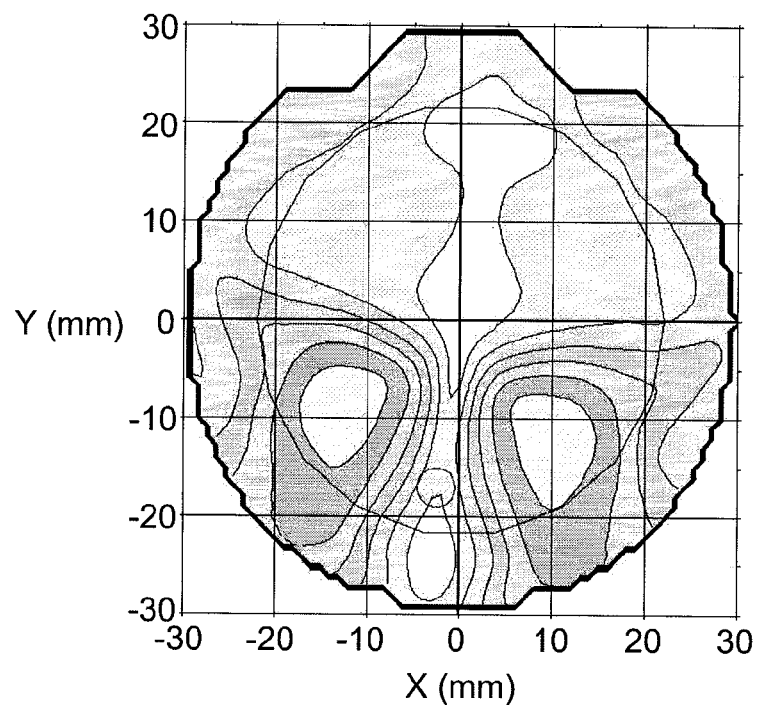
FIG. 5a is a cylinder contour map of the unwanted astigmatism of a second lens of the invention.
Figure 5B:
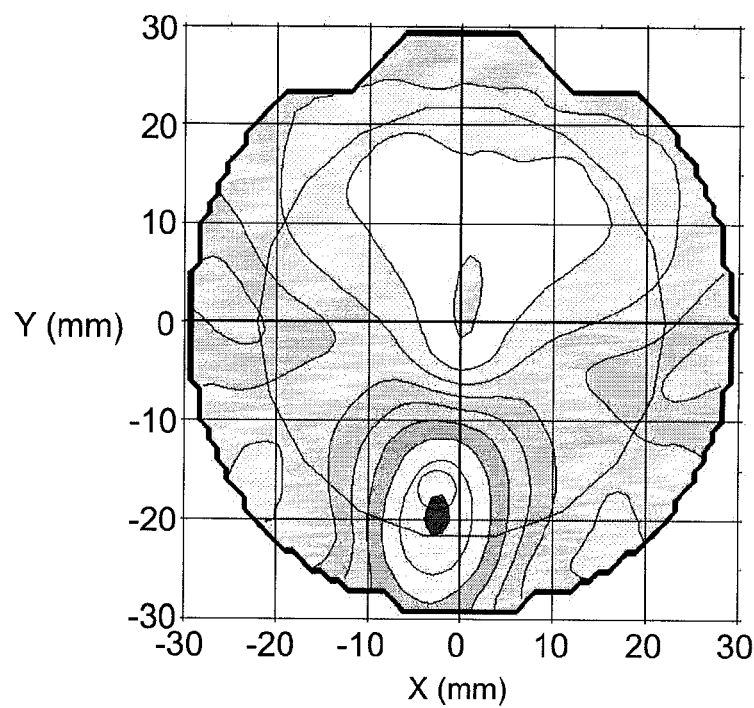
Figure 5C:
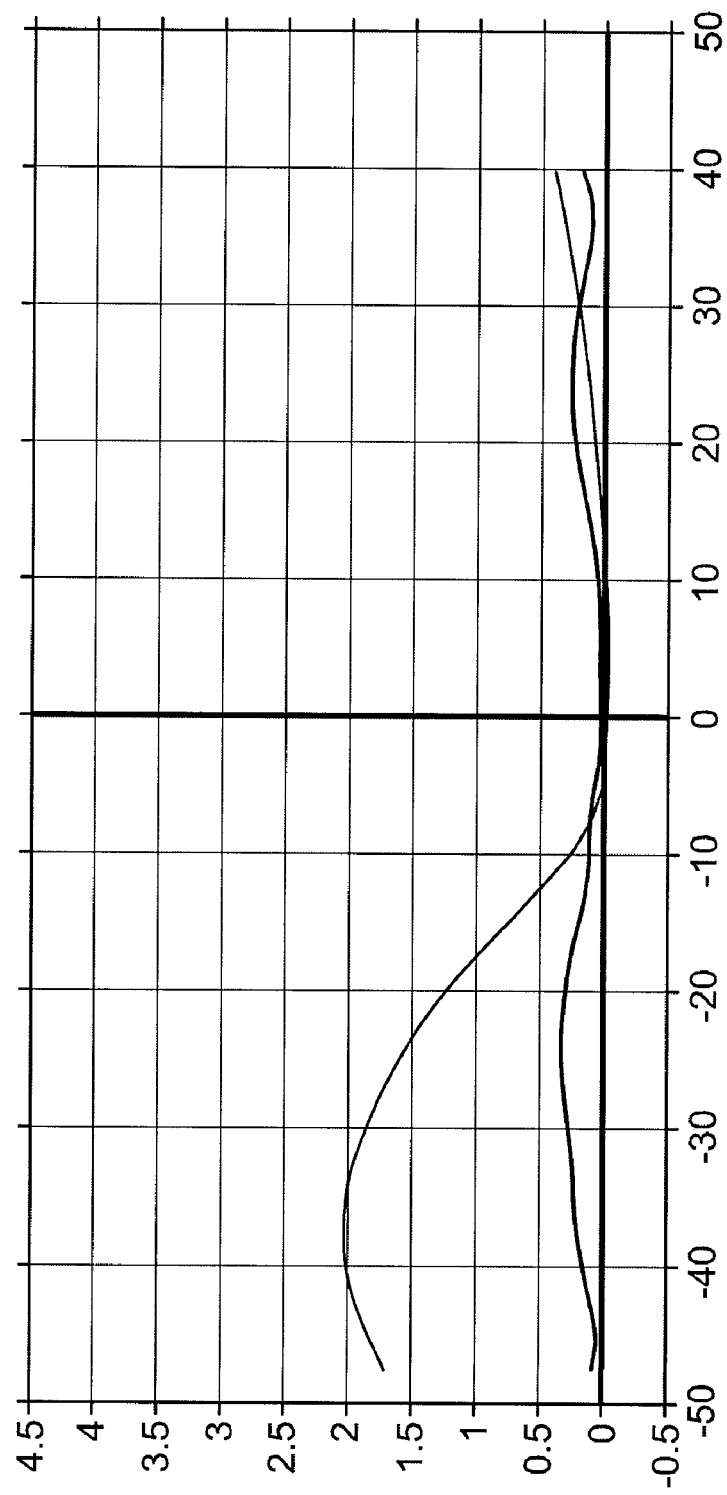

The surface (W) of Example 2 was shifted vertically so that the fitting point was located at y=+2 mm. The optical data for the resulting progressive surface (W) is shown in Table 1. The power and cylinder contour plots are shown in FIGS. 5a and 5b and the power and cylinder profile along the corridor in FIG. 5c. This resulted in the lengthening of the corridor by 2 mm to 12.4 mm which is similar to a conventional standard corridor length progressive design. The maximum unwanted astigmatism increases by only 0.05 diopters to 1.63 diopters. The corridor factor, $C_f$ was 9.96 mm. The fitting point was marked at y=+2 mm.

TABLE

| Optical Parameter | Lens 1 | Lens 2 | Lens 3 | Surface A Example 1 | Surface W Example 1 | Example 2 |
|---|---|---|---|---|---|---|
| Add Power (D) | 2.04 | 2.15 | 2.04 | 2.04 | 2.01 | 2.03 |
| Distance Width (mm) | 7.9 | 18.3 | 13.5 | 25.2 | 6.3 | 23.4 |
| Reading Width (mm) | 18.3 | 11.2 | 16.2 | 16.0 | 14.1 | 15.8 |
| Reading Power Width (mm) | 13.8 | 9.5 | 8.0 | 9.2 | 7.4 | 8.2 |
| Corridor Length (mm) | 11.6 | 10.5 | 12.3 | 12.3 | 10.4 | 12.4 |
| Corridor Width (mm) | 6.6 | 5.4 | 8.6 | 8.4 | 7.0 | 6.6 |
| Max. Astig. (D) | 2.64 | 2.36 | 1.53 | 1.56 | 1.58 | 1.63 |
| $C_f$ (mm) | 15.0 | 11.5 | 9.23 | 9.4 | 8.17 | 9.96 |

Example 1 demonstrates that, beginning with a surface with a standard corridor length and using the method of the invention, a surface with a shorter corridor length than the prior art lenses, but without the high unwanted astigmatism results. In Example 2, a lens wearer may be fit higher, by about 2 mm, to lengthen the corridor to as standard length without changing the unwanted astigmatism.

What is claimed is:

1. A method for designing a progressive addition lens, comprising the steps of: a.) providing a first progressive addition surface having a first add power and a first corridor of a first length; b.) expressing the first surface as a first plurality of sag values; c.) multiplying the first plurality of sag values by a first blending function; d.) providing a second progressive addition surface having a second add power and a second corridor of a second length; e.) expressing the second surface as a second plurality of sag values; f.) multiplying the second plurality of sag values by a second blending function that may be the same or different from the first blending function; g.) adding the multiplied first and second plurality of sag values to produce a third progressive surface having the first add power, a third corridor wherein a length of the third corridor is at least about 1 mm less than the first and second corridor lengths.

2. The method of claim 1, wherein the first progressive addition surface design further comprises a first maximum unwanted astigmatism, the second progressive addition surface design further comprises a second maximum unwanted astigmatism and the third progressive addition surface design further comprises a third maximum unwanted astigmatism wherein the third maximum unwanted astigmatism is greater by about 0.2 or less diopters than one of the first and second maximum unwanted astigmatism.

3. A method for designing a progressive addition lens, comprising the steps of: a.) providing a first progressive addition surface having a first add power and a first corridor of a first length; b.) expressing the first surface as a first plurality of sag values; c.) multiplying the first plurality of sag values by a first blending function; d.) providing a second progressive addition surface having a second add power and a second corridor of a second length; e.) expressing the second surface as a second plurality of sag values; f.) multiplying the second plurality of sag values by a second blending function that may be the same or different from the first blending function; g.) blending radially the multiplied first and second plurality of sag values to produce a third progressive surface having the first add power, a third corridor wherein a length of the third corridor is at least about 1 mm less than the first and second corridor lengths.

4. The method of claim 3, wherein the first progressive addition surface design further comprises a first maximum unwanted astigmatism, the second progressive addition surface design further comprises a second maximum unwanted astigmatism and the third progressive addition surface design further comprises a third maximum unwanted astigmatism wherein the third maximum unwanted astigmatism is greater by about 0.2 or less diopters than one of the first and second maximum unwanted astigmatism.

5. A method for designing a progressive addition lens, comprising the steps of: a.) providing a first progressive addition surface having a first add power and a first corridor of a first length; b.) expressing the first surface as a first plurality of sag values; c.) multiplying the first plurality of sag values by a first blending function; d.) providing a second progressive addition surface having a second add power and a second corridor of a second length; e.) expressing the second surface as a second plurality of sag values; f.) multiplying the second plurality of sag values by a second blending function that may be the same or different from the first blending function; g.) adding the multiplied first and second plurality of sag values to produce a third progressive surface having the first add power, a third corridor wherein a length of the third corridor is at least about 1 mm less than one of the first and second corridor lengths.

6. The method of claim 5, wherein the first progressive addition surface design further comprises a first maximum unwanted astigmatism, the second progressive addition surface design farther comprises a second maximum unwanted astigmatism and the third progressive addition surface design further comprises a third maximum unwanted astigmatism wherein the third maximum unwanted astigmatism is greater by about 0.2 or less diopters than one of the first and second maximum unwanted astigmatism.

7. A method for designing a progressive addition lens, comprising the steps of: a.) providing a first progressive addition surface having a first add power and a first corridor of a first length; b.) expressing the first surface as a first plurality of sag values; c.) multiplying the first plurality of sag values by a first blending function; d.) providing a second progressive addition surface having a second add power and a second corridor of a second length; e.) expressing the second surface as a second plurality of sag values; f.) multiplying the second plurality of sag values by a second blending function that may be the same or different from the first blending function; g.) blending radially the multiplied first and second plurality of sag values to produce a third progressive surface having the first add power, a third corridor wherein a length of the third corridor is at least about 1 mm less than one of the first and second corridor lengths.

8. The method of claim 7, wherein the first progressive addition surface design further comprises a first maximum unwanted astigmatism, the second progressive addition surface design farther comprises a second maximum unwanted astigmatism and the third progressive addition surface design further comprises a third maximum unwanted astigmatism wherein the third maximum unwanted astigmatism is greater by about 0.2 or less diopters than one of the first and second maximum unwanted astigmatism.

9. The method of claim 1, wherein the second surface is of a different design than the first surface.

10. The method of claim 3, wherein the second surface is of a different design than the first surface.

11. The method of claim 5, wherein the second surface is of a different design than the first surface.

12. The method of claim 7, wherein the second surface is of a different design than the first surface.

13. The method of claim 9, wherein the method farther comprises the step of scaling the first and the second surfaces.

14. The method of claim 10, wherein the method further comprises the step of scaling the first and the second surfaces.

15. The method of claim 11, wherein the method further comprises the step of scaling the first and the second surfaces.

16. The method of claim 12, wherein the method further comprises the step of scaling the first and the second surfaces.

17. The method of claim 1, further comprising the step of aspherizing a distance vision zone of the first or second surface.

18. The method of claim 3, further comprising the step of aspherizing a distance vision zone of the first or second surface.

19. The method of claim 5, further comprising the step of aspherizing a distance vision zone of the first or second surface.

20. The method of claim 7, further comprising the step of aspherizing a distance vision zone of the first or second surface.

21. A lens produced by the method of claim 1.

22. A lens produced by the method of claim 3.

23. A lens produced by the method of claim 5.

24. A lens produced by the method of claim 7.

25. The lens of claim 21, wherein the lens is a spectacle lens.

26. The lens of claim 22, wherein the lens is a spectacle lens.

27. The lens of claim 23, wherein the lens is a spectacle lens.

28. The lens of claim 24, wherein the lens is a spectacle lens.

29. The lens of claim 25, wherein a convex surface of the lens is of a symmetric, soft progressive design.

30. The lens of claim 26, wherein a convex surface of the lens is of a symmetric, soft progressive design.

31. The lens of claim 27, wherein a convex surface of the lens is of a symmetric, soft progressive design.

32. The lens of claim 28, wherein a convex surface of the lens is of a symmetric, soft progressive design.

* * * * *